United States Patent [19]
Gomez

[11] Patent Number: 4,785,503
[45] Date of Patent: Nov. 22, 1988

[54] SHRIMP PEELER

[76] Inventor: Jesus Gomez, 6034 SW. 27 St., Miami, Fla. 33155

[21] Appl. No.: 172,263

[22] Filed: Mar. 23, 1988

[51] Int. Cl.$^4$ .............................................. A22C 29/02
[52] U.S. Cl. ...................................................... 17/73
[58] Field of Search ........................... 17/73, 71, 72, 48

[56] References Cited
U.S. PATENT DOCUMENTS 2,792,590 5/1957 Stone .................................... 17/73 X
4,202,076 5/1980 Rancatore ................................ 17/48

FOREIGN PATENT DOCUMENTS 63408 6/1949 Netherlands ............................. 17/73

Primary Examiner—Willie G. Abercrombie
Attorney, Agent, or Firm—J. Sanchelima

[57] ABSTRACT

A device for peeling shrimps, of any reasonable size, that comprises a reservoir and a cover with one or more openings where tubular knife assemblies are positioned. Cooperating opening in the cover align with the tubular knife assemblies and allow the peeled shrimp through. A knife element is mounted on the inner surface of the tubular knife assemblies to remove the visceral parts of the shrimp.

5 Claims, 2 Drawing Sheets

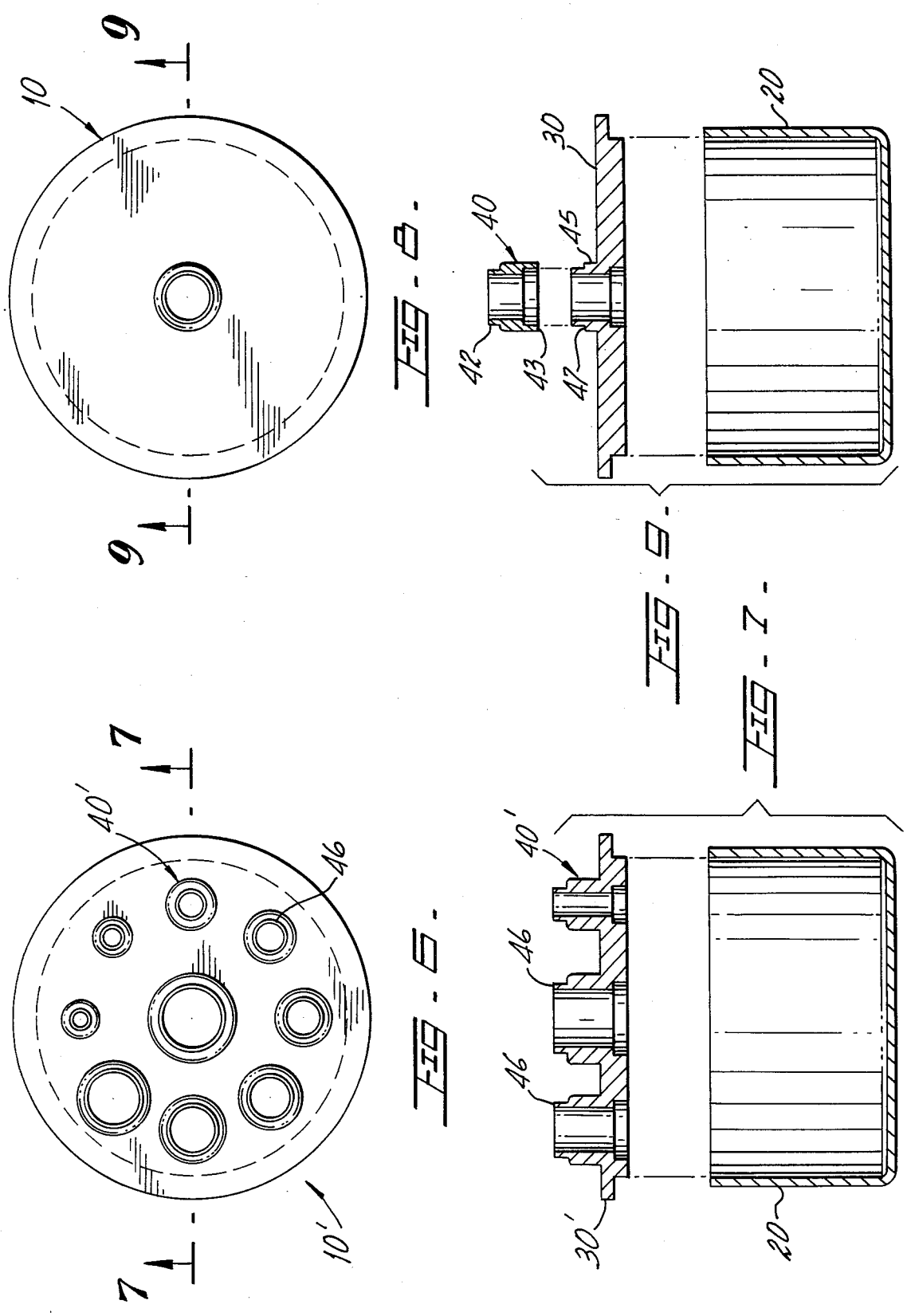

SHRIMP PEELER

BACKGROUND OF THE INVENTION

1. Field of the Invention

The present invention relates to shrimp peelers.

2. Description of the Related Art

The consumption of shrimps has been in an ever increasing pattern and one of the difficulties with its preparation is peeling the shrimp. Usually, the shrimp is peeled individually with knives which is a time consuming operation. Mechanized attempts usually involve rather complicated pieces of machinery that are not within reach to the typical household.

SUMMARY OF THE INVENTION

It is one of the main objects of the present invention to provide a shrimp peeler that is reliable and effective.

It is another object of this present invention to provide such a peeler that does not utilize moving parts.

It is yet another object of the present invention to provide such a peeler that can be used for different sizes of shrimps.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 shows a top plan view of an embodiment of the peeler device with several knife assemblies.

FIG. 7 represents a cross-sectional view of FIG. 6 taken along line 7—7.

FIG. 8 illustrates a top plan view of an alternate embodiment for the peeler device incorporating a removable knife socket assembly.

FIG. 9 is a representation of a cross-sectional view of the peeler device shown in FIG. 8 taken along line 9—9.

DETAILED DESCRIPTION OF THE PREFERRED EMBODIMENT

Figure 1:
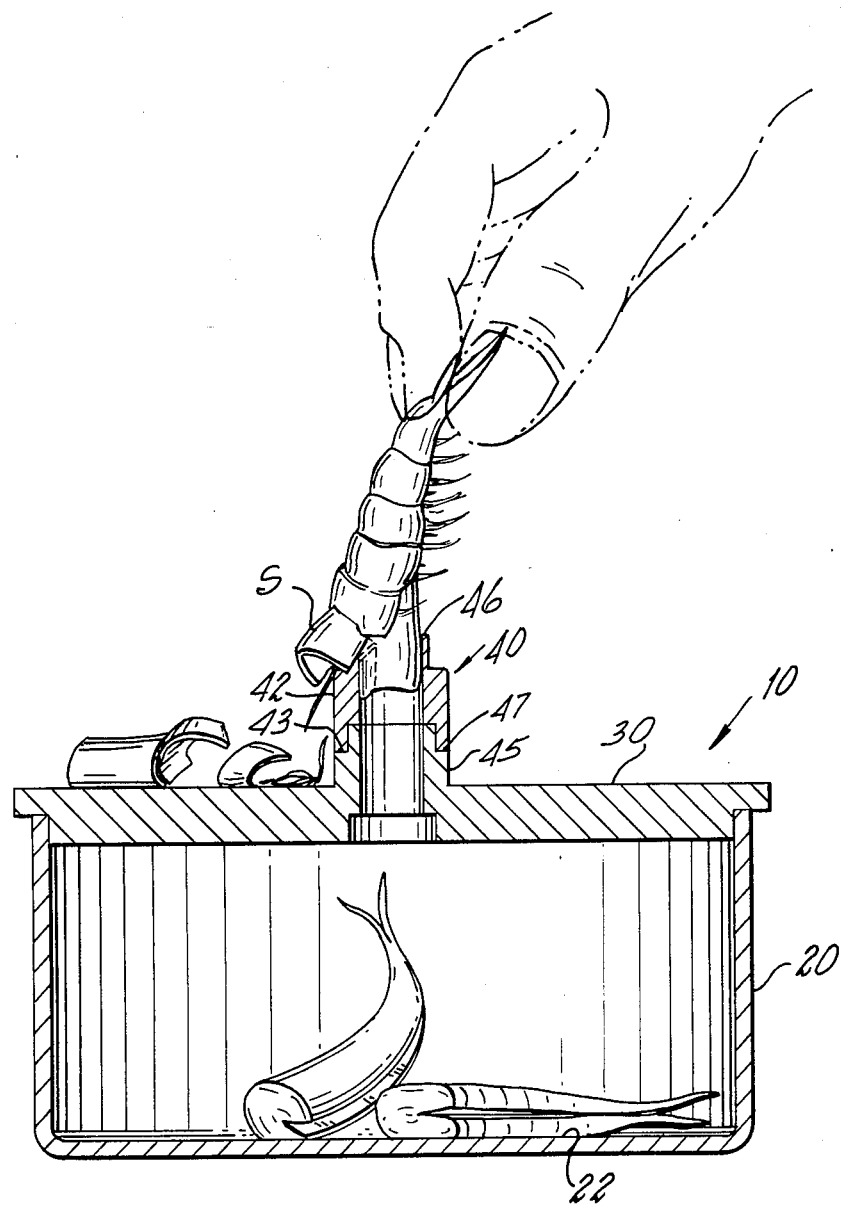
FIG. 1 represents the device subject of the present invention illustrating how the shrimp is inserted through the knife assembly and the peeled shrimp collected at the bottom.
Figure 2:
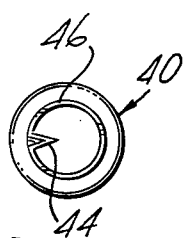
FIG. 2 shows a top plan view of the knife assembly used in FIG. 1 which incorporates a punched in knife element.

Referring now to the drawings, where the present invention is generally referred to with numeral 10, it can be observed that it basically includes a reservoir member 20 with a top member 30 and knife socket assembly 40 mounted on top surface of cover member 30. Preferably, reservoir member 20 has a cylindrical shape and cover member 30 has a circular shape and they cooperate to form a storage compartment where the peeled shrimp is stored.

Figure 4:
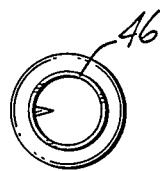
FIG. 4 is a representation of a top plan view of an alternate embodiment for the knife assembly.
Figure 3:
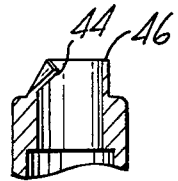
FIG. 3 illustrates a cross-sectional view of the knife assembly of FIG. 2.
Figure 5:
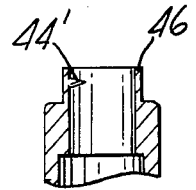
FIG. 5 is a cross-sectional view of FIG. 4.

Knife socket assembly 40 comprise a tubular member 42 that sits on protruding tubular base member 45 and connects with reservoir member 20 through openings on said member that coincide with the tubular members 42. Base member 45 and tubular member 42 include cooperating steps 43 and 47 that help position socket assemblies 42. Knife element 44 is rigidly formed inside tubular member 42 and it extends inwardly a sufficient distance to permit a user to make a longitudinal slit on the shrimp being peeled thereby removing its visceral parts. Preferably, knife element 44 is formed by punching in a portion of the rim 46 of tubular member 42. An alternate embodiment for knife element 44' in knife assembly 40' is shown in FIGS. 4 and 5. Here, instead of punching in tubular member 42, knife element 44' is either casted or soldered on the inner surface of tubular member 42.

Rim 46 of tubular member 42 coincides substantially with the outer diameter of the shrimp being passed through tubular member 42 so that the skin S of the shrimp hits against rim 46 thereby causing it to separate from the body of the shrimp. The peeled shrimp then falls on bottom 22 of reservoir member 20 where it can be stored in the refrigerator until it is going to be used.

In FIGS. 6 and 7 a multiple knife assembly embodiment 10' is shown where the user may select one according to the size of the shrimp to be peeled. Cover member 30' has a corresponding number of cooperating openings. FIGS. 8 and 9 show an alternate embodiment where a removable knife socket assembly is used and the user selects the socket that has suitable dimensions for the shrimp to be peeled.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A device for peeling shrimps, comprising:
   - A. a reservoir member;
   - B. a cover member cooperatively and removably covering said reservoir member and said cover member including at least one opening connecting the space defined by said reservoir member and said cover member;
   - C. at least one knife means mounted over said opening and including a tubular member having a diameter that is slightly larger than the diameter of the shrimp being peeled and said tubular member including a knife element rigidly mounted to the inner surface of said tubular member and extending inwardly so that visceral parts of said shrimp can be removed while it is being peeled.

2. The device set forth in claim 1 further comprising a plurality of said knife means each having a different diameter and a corresponding number of cooperating openings in said cover member.

3. The device set forth in claim 1 wherein said cover means includes a protruding tubular base member substantially of the same dimensions as the cooperating openings over which it is positioned and said knife means includes a socket assembly having tubular shape and including an inner wall and said knife element being inwardly mounted on said inner wall.

4. The device set forth in claim 3 wherein said knife element is formed by punching in said tubular socket assembly.

5. The device set forth in claim 4 wherein said knife element is soldered to said inner surface.

* * * * *